US011481790B2

(12) United States Patent
Belanger et al.

(10) Patent No.: US 11,481,790 B2
(45) Date of Patent: *Oct. 25, 2022

(54) CUSTOMER EXPERIENCE ARTIFICIAL INTELLIGENCE MANAGEMENT ENGINE

(71) Applicant: Cerebri AI Inc., Austin, TX (US)

(72) Inventors: Jean Belanger, Austin, TX (US); Michael L. Roberts, Austin, TX (US); Gabriel M. Silberman, Austin, TX (US); Karen Bennet, Toronto (CA)

(73) Assignee: Cerebri AI Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/001,441

(22) Filed: Aug. 24, 2020

(65) Prior Publication Data
US 2021/0110412 A1    Apr. 15, 2021

Related U.S. Application Data

(63) Continuation of application No. 15/456,059, filed on Mar. 10, 2017, now Pat. No. 10,783,535.
(Continued)

(51) Int. Cl.
*G06Q 10/06* (2012.01)
*G06Q 30/02* (2012.01)
(Continued)

(52) U.S. Cl.
CPC ....... *G06Q 30/0201* (2013.01); *G06K 9/6221* (2013.01); *G06K 9/6278* (2013.01);
(Continued)

(58) Field of Classification Search
None
See application file for complete search history.

(56) References Cited

U.S. PATENT DOCUMENTS 7,853,465 B2 * 12/2010 Molesky .............. G06Q 10/063
   705/7.11
8,665,275 B1 * 3/2014 Patrick .................. G06F 11/323
   345/440
(Continued)

FOREIGN PATENT DOCUMENTS

WO    WO-03042955 A1 *  5/2003  ............. G09B 9/003

OTHER PUBLICATIONS

UBS Warburg "In Search of Alpha Alternative Investment Strategies", In Search of Alpha, Oct. 2000, pp. 1-182 (Year: 1020) (Year: 2000).*

*Primary Examiner* — Romain Jeanty
(74) *Attorney, Agent, or Firm* — Pillsbury Winthrop Shaw Pittman LLP (57) ABSTRACT

In some implementations, an event timeline that includes one or more interactions between a customer and a supplier may be determined. A starting value may be assigned to individual events in the event timeline. A sub-sequence comprising a portion of the event timeline that includes at least one reference event may be selected. A classifier may be used to determine a previous relative value for a previous event that occurred before the reference event and to determine a next relative value for a next event that occurred after the reference event until all events in the event timeline have been processed. The events in the event timeline may be traversed and a monetized value index assigned to individual events in the event timeline.

17 Claims, 7 Drawing Sheets

Related U.S. Application Data (60) Provisional application No. 62/337,311, filed on May 16, 2016.

(51) Int. Cl.
    *G06N 20/00*     (2019.01)
    *G06K 9/62*     (2022.01)
    *G06N 5/02*     (2006.01)
    *G06N 7/00*     (2006.01)
    *G06F 8/35*     (2018.01)

(52) U.S. Cl.
    CPC .............. *G06N 5/025* (2013.01); *G06N 7/005* (2013.01); *G06N 20/00* (2019.01); *G06Q 10/067* (2013.01); *G06F 8/35* (2013.01)

(56) References Cited

U.S. PATENT DOCUMENTS

| | | | | |
|---|---|---|---|---|
| 2008/0249858 A1* | 10/2008 | Angell | ............... | G06Q 30/0277 705/14.43 |
| 2010/0324948 A1* | 12/2010 | Kumar | ............. | G06Q 10/06311 705/7.13 |
| 2011/0015969 A1* | 1/2011 | Loeb | ..................... | G06Q 10/00 705/7.29 |

* cited by examiner

CUSTOMER EXPERIENCE ARTIFICIAL INTELLIGENCE MANAGEMENT ENGINE

RELATED APPLICATIONS

This application is a continuation of U.S. Non-Provisional patent application Ser. No. 15/456,059, titled "BUSINESS ARTIFICIAL INTELLIGENCE MANAGEMENT ENGINE," filed Mar. 10, 2017. U.S. Non-Provisional patent application Ser. No. 15/456,059 claims the domestic benefit under Title 35 of the United States Code § 119(e) of U.S. Provisional Patent Application Ser. No. 62/337,311, titled "BUSINESS ARTIFICIAL INTELLIGENCE MANAGEMENT ENGINE," filed May 16, 2016. Each of the parent filings listed above is hereby incorporated by reference for all purposes.

BACKGROUND OF THE INVENTION

Field of the Invention

The invention relates to artificial intelligence (AI) and more particularly to machine learning.

Description of the Related Art

The goal of a supplier (e.g., a business vendor or a service provider), is to efficiently and cost-effectively maintain a close relationship with each customer. In particular, a supplier desires to understand what motivates a customer's actions to enable the supplier to (i) optimize the economic value that the supplier derives from the customer, (ii) provide offerings tailored to the customer's needs, (iii) provide offerings with terms that cause the customer to finalize a transaction, and (iv) retain the customer for as long as possible. For example, prior to purchasing an item (e.g., a product or a service), a customer may have several interactions with the supplier, such as visiting a website to obtain detailed information about the item, chatting (e.g., online or in-person) with a salesperson, and the like. Subsequent to purchasing the item, the customer may have additional interactions with the supplier, such as obtaining warranty service, chatting with a salesperson, purchasing an additional item (e.g., an accessory to the first item that was purchased). However, the supplier may have no idea as to what value the customer places on each interaction.

The supplier may spend money to facilitate interactions with the customer that the customer does not value while not spending enough money on interactions that the customer values. For example, the supplier may spend money to up-sell or cross-sell additional products by (1) having a salesperson call the customer and (2) by sending product brochures to the customer via mail. The supplier may have no idea as to the value of these interactions for this particular customer, resulting in the supplier spending more money on interactions that have less value to the customer and less money on interactions that have more value to the customer. Thus, the supplier may not be able to cost-effectively and efficiently engage in interactions of value to the customer.

SUMMARY OF THE INVENTION

In some implementations, an event timeline that includes one or more interactions between a customer and a supplier may be determined. A starting value may be assigned to individual events in the event timeline. A sub-sequence comprising a portion of the event timeline that includes at least one reference event may be selected. A classifier may be used to determine a previous relative value for a previous event that occurred before the reference event and to determine a next relative value for a next event that occurred after the reference event until all events in the event timeline have been processed. The events in the event timeline may be traversed and a monetized value index assigned to individual events in the event timeline.

DETAILED DESCRIPTION

Conventional approaches used by suppliers to understand customers lack a way to quantify how a customer intrinsically values a supplier and the supplier's products. In addition, conventional approaches fail to measure potential revenue from customers on a customer-by-customer basis. For example, suppliers may use a "one size fits all" rather than targeting customers using an individualized approach. By taking into account available monetary information and non-monetary information, a supplier can quantify how each customer values the supplier and the supplier's offerings. For example, the supplier can measure potential revenue from each individual customer and determine a value for each event (e.g., interaction) in an event timeline. Having such an insight can help the supplier create marketing and sales campaigns that are tailored to each customer, e.g., tailored to the customer's preferences and circumstances, tailored to the customer's preferred communication style and communication channels, and the like.

The systems and techniques described herein may be used to analyze an event timeline that includes events (e.g., interactions between the customer and the supplier) and assign a value index to each event. The interactions between the customer and the supplier may include monetary transactions (e.g., purchase of an item) and non-monetary transactions (e.g., chat with a salesperson). The interactions may be (i) between a business and a consumer ("B2C") or (ii) between one business and another business ("B2B"). A total value index represents an intrinsic (monetary) value that the customer has at any given time in the customer's relationship with the supplier and takes into account both transactional and non-transactional information that is relevant to the relationship. Furthermore, the value index of individual events in the event timeline may be dynamically adjusted when additional relevant information becomes available. Non-transactional information may include such things as macro-economic data concerning unemployment rates, interest rates, etc., if such events and data points have a material and discernable impact on the intrinsic and monetary value a customer places on their relationship with a supplier. This is especially relevant where high dollar purchases such as homes and vehicles are concerned. The types of events for which a value index is determined may range from broad (e.g., how much a customer values the supplier's overall corporate brand) to narrow (e.g., how much a customer values a specific product of the supplier).

Thus, an event timeline may be analyzed and a value index determined for events in the timeline. The value indexes may represent a customer's view of the intrinsic and monetary value that the customer ascribes to the customer's relationship to the supplier at any given time. The supplier may use the value indexes to customize marketing, product offerings, and the like. By focusing on those aspects that a customer values the most in the customer-supplier relationship, a supplier can increase sales (e.g., new sales, up-sells, and cross-sells), increase the length of the relationship between the supplier and the customer, and cost effectively manage marketing, sales, service, branding, and the like.

Figure 1:
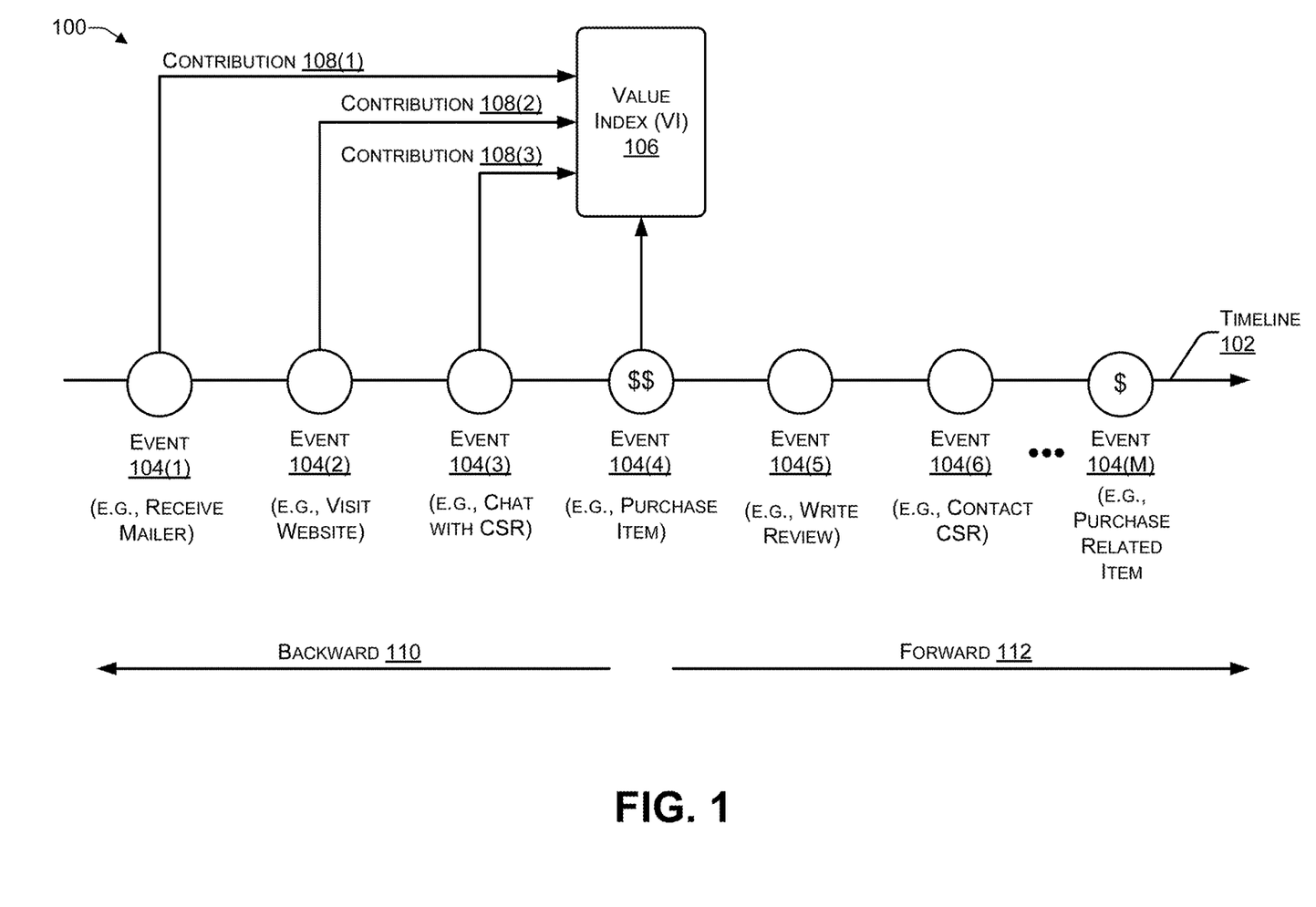
FIG. 1 is a block diagram illustrating an event timeline according to some embodiments.

FIG. 1 is a block diagram 100 illustrating an event timeline according to some embodiments. A timeline 102 may include one or more events 104(1), 104(2), 104(3), 104(4), 104(5), 104(6), to 104(M) (where M>0). A supplier may specify certain types of events, referred to as reference events, that the supplier considers particularly meaningful. The events prior to a reference event may contribute to the reference event occurring and may be assigned a value to show their relative contribution to the occurrence of the reference event.

Each of the events 104 may involve a transaction between a customer and a supplier. For example, the event 104(1) may include the customer receiving a catalog, brochure, or other mailer via mail (or email), piquing the customer's interest in one or more items offered by the supplier. The event 104(2) may include the customer visiting a website of the supplier to research one or more items. The event 104(3) may include the customer chatting (e.g., online or in-person) with a customer service representative (CSR) or other sales representative. The event 104(4) may include the customer purchasing an item. For many businesses, the event 104(4) may be designated as a reference event. The business may use the systems and techniques described herein to determine a value index 106 associated with the event 104(4) and determine a contribution 108(1) associated with the event 104(1), a contribution 108(2) associated with the event 104(2), and a contribution 108(3) associated with the event 104(3). For example, for a first customer, on a scale between 0.00 and 1.00, the contribution 108(1) may be 0.3 (e.g., 30%), the contribution 108(2) may be 0.2 (e.g., 20%), the contribution 108(3) may be 0.5 (e.g., 50%). In this example, the supplier may determine that the customer values the chat with the CSR the most and values visiting the website the least. Based on this information, the supplier may use a CSR (e.g., rather than customized advertisements on the website or customized mailers) to initiate contact with the customer for additional sales (e.g., new sales, up-sells, and cross-sells).

After the reference event occurs, additional (e.g., subsequent) events may occur and the customer may have a value for each of the subsequent events. For example, the event 104(5) may include the customer writing an online review that the supplier publishes on the supplier's website. The event 104(6) may include the customer contacting a CSR. For example, the customer may ask the CSR "How do I do X with the item?" The CSR may suggest that the customer can perform X by purchasing a related item, such as an accessory, to the original item that was purchased at event 104(4). The event 104(M) may include the customer purchasing the related item.

The value index 106 is an integration of several events, e.g., the events 104(1) (receiving a promotional mailer), 104(2) (visiting a website), and 104(3) (online or in-person chat). The additional events include 104(5) (writing a review or responding to a survey), 104(6) (contacting customer service, e.g., to clarify of a product feature or the availability of accessories), and 104(M) (the purchase of a related item). Some of the events 104, such as the purchase event 104(4) have a known value. For example, a customer purchasing a vehicle for $30,000 has a known value, e.g., $30,000, associated with the event. Conventionally, the value of the other events is unknown. The systems and techniques described herein enable a value to be assigned to each event in the timeline 102, include events prior to the reference event 104(4) and events subsequent to the reference event 104(4).

Each event in the timeline 102 influences subsequent events, including reference events (e.g., purchases), similar to how each layer in a neural network influences the next layer, or similar to how incremental observations influence belief in Bayesian networks. Rather than try to identify relationships of the events to each other, the relationships of the events in the timeline 102 are related to a common value, e.g., the Value Index (VI) 106. The single value VI 106 is similar to a single output node in a neural network, or to a Bayesian belief value in a Bayesian Network. The value of VI 106 is tied to quantifiable transactions, such as the reference event 104(4). For example, the purchase of an item valued at $30,000 may be used to assign the VI 106 the value of $30,000.

An algorithm may move backward 110 through the timeline 102 and assign relative (e.g., contributory) values to the prior events (e.g., 104(3), 104(2), and 104(1)). The algorithm may move forward 112 and assign relative (contributory) values to the subsequent events (e.g., 104(5) to 104(M)).

After determining the VI 106, the timeline 102 may be modeled as a set of sub-sequences (e.g., portions of the timeline 102) yielding a value for the VI based on the reference event 104(4). Using machine learning techniques, the individual contributions 108(3), 108(2), 108(1) of the preceding events 104(3), 104(2), 104(1), respectively, can be estimated, similar to the way that connection weights in a neural network are determined, or similar to the way that the evidentiary weight of facts in a Bayesian network are computed.

Figure 2:
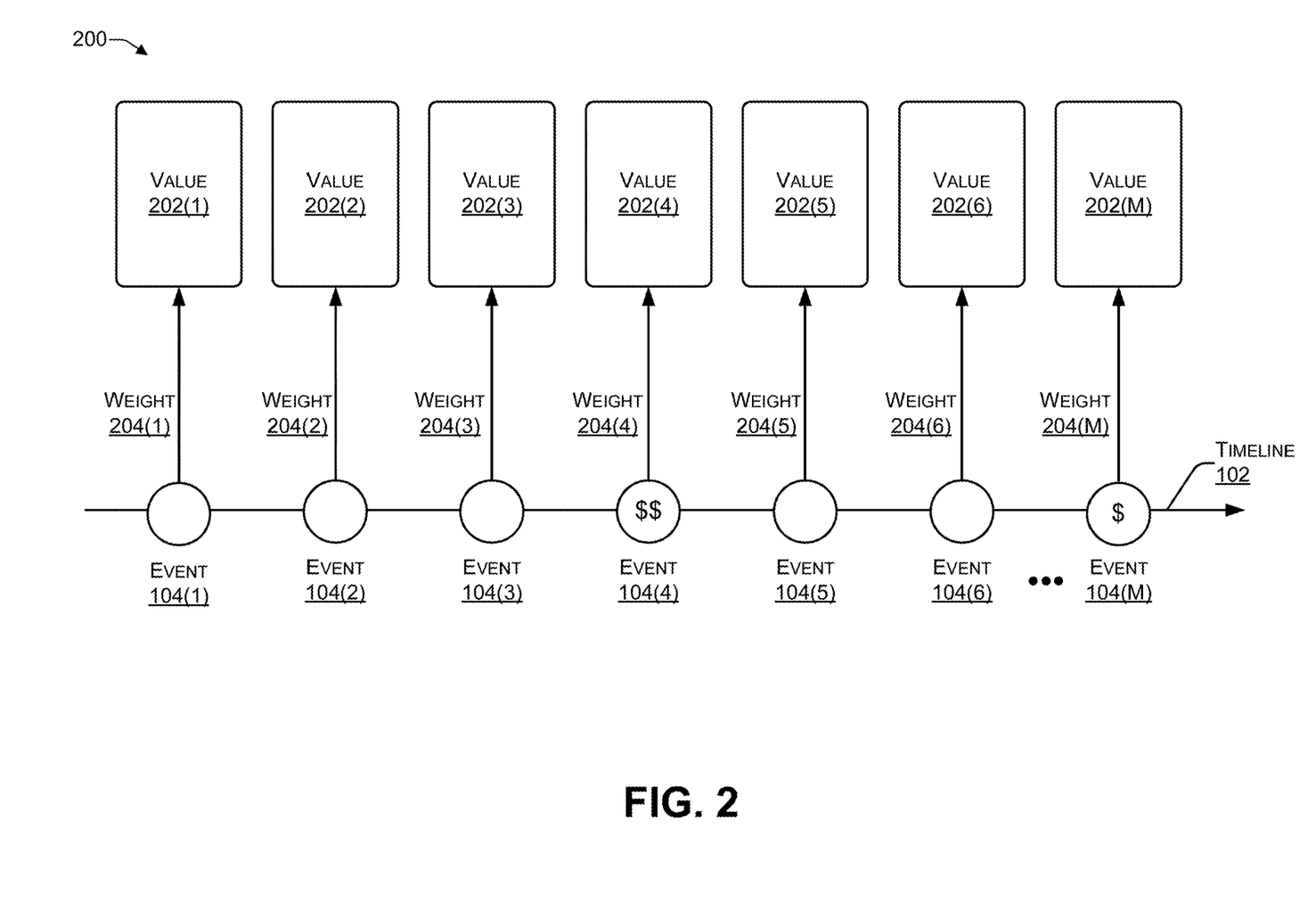
FIG. 2 is a block diagram illustrating determining a value for events in an event timeline according to some embodiments.

FIG. 2 is a block diagram 200 illustrating determining a value for events in an event timeline according to some embodiments. A value index 202(4) may be determined for the reference event 104(4). Machine learning may be used to estimate the contributions 108 of individual events.

An incremental (e.g., contributory) value 202 may be determined for each non-reference event in the timeline 102. For example, value 202(1) may be determined for event 104(1), value 202(2) may be determined for event 104(2), and so on (excluding the reference event 104(4)) up to determining value 202(M) for event 104(M). After the values 202 have been determined (e.g., estimated using machine learning) for each event in the timeline 102, the algorithm may go back through the timeline 102 to determine (e.g., estimate using machine learning) event weights 204, using sub-sequences of the timeline 102. A sub-sequence of the timeline 102 is a portion of the timeline 102 that includes at least one reference event. For example, in FIG. 1, events 104(1) to 104(4) may be a sub-sequence of the timeline 102 that includes the reference event 104(4).

Thus, each event 104 is assigned a value 202. The value 202 of each event 104 may be considered a component of the value of one or more subsequent events. The values 202 can be used by a supplier to tailor marketing, sales, and other activities for an individual consumer, based on which of the events 104 have a higher weight 204 (e.g., higher value) for an individual consumer. For example, if the weight 204(1) of the visit to the website (event 104(2)) is consistently small (e.g., less than a threshold amount) across multiple timelines, the low value placed by the customer on the visit to the website may indicate the need to review and redesign the website for a better customer experience.

Figure 4:
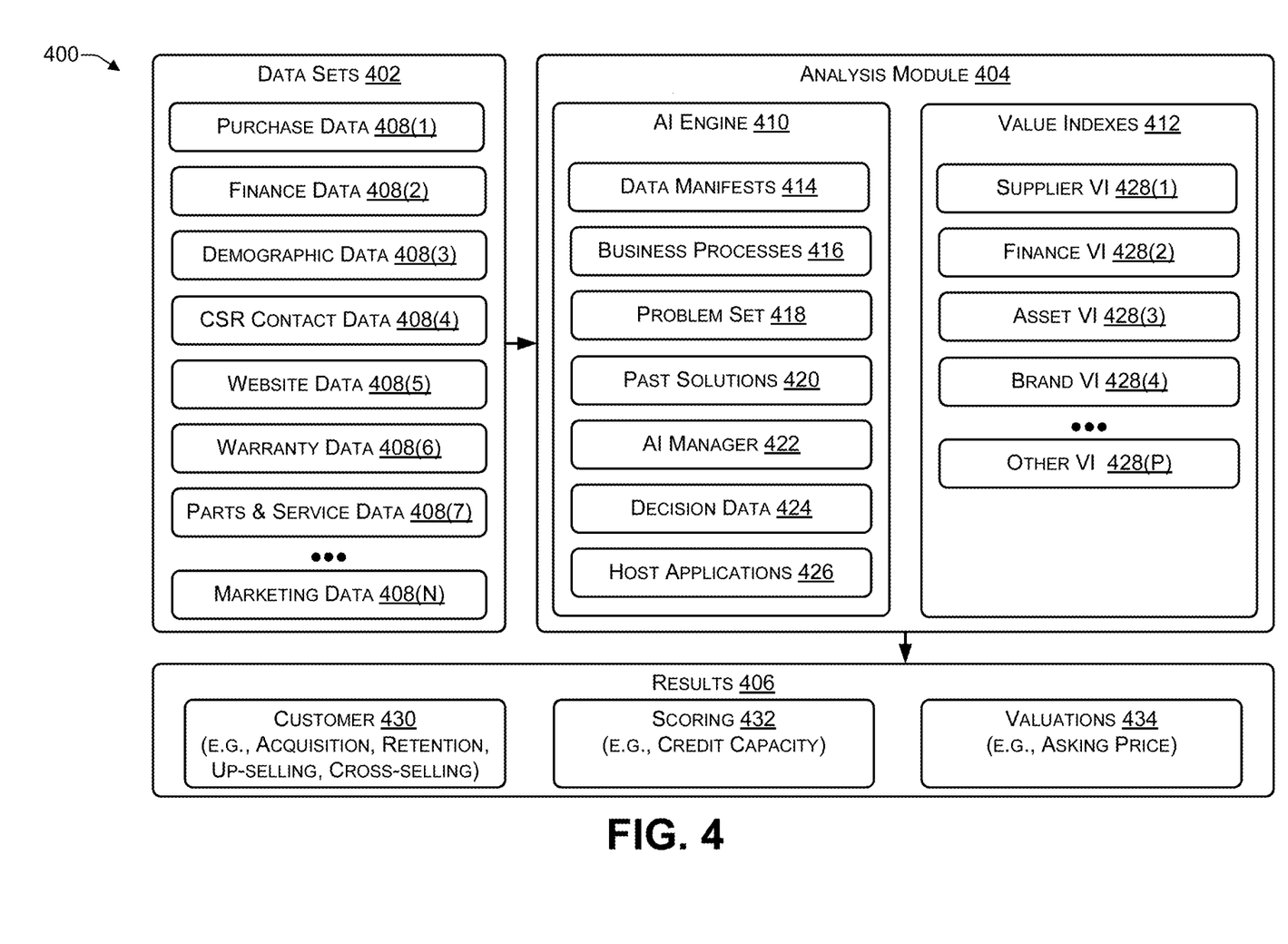
FIG. 4 is a block diagram illustrating an architecture to analyze event timelines according to some embodiments.

The various uses of value indexes are discussed further in FIG. 4. The accuracy of the value indexes increases as the amount of data associated with the supplier-customer relationship increases, e.g., more data means more accurate value indexes. Much of the supplier-customer relationship data can be gathered from various enterprise software systems that are used to store information about a customer and information obtained from third party services (e.g., FICO score). In some cases, additional information about the supplier-customer relationship may be augmented using data from customer activities on social network, internet forum postings, relevant news items, macroeconomic data and forecasts, and the like.

For example, a supplier may, based on the value indexes of financial transactions associated with the customer, provide the customer with credit offerings specifically tailored to the customer's preferences and based on the customer's ability to service the corresponding debt. As a second example, a real estate agent may determine the order in which to show the features of residential real estate properties to a prospective customer, to reduce the time to make a purchase decision. In this example, information collected from previous and current listings as well as the preferences of the customer (e.g., based on ratings of the listings offered) may be used. To illustrate, the real estate agent may send the customer a set of property listings. The buyer may examine and rate (e.g., love it, hate it, want to see it each property listing), write comments about at least a portion of the listings, and the like. By analyzing the contributory value indexes, such as listing price, square footage, number of bedrooms, number of bathrooms, yard size, the customer ratings of each property listing, the comments, and the like, the customer's tastes in a house as well as the customer's financial affinity can be determined. The customer's tastes and financial affinity can be used to identify which features the customer values and used to present properties to the customer. For example, if a determination is made that the customer values yard size higher than other factors, the customer may be shown the front yard and back yard, before taking the customer into the house. If a determination is made that the customer values listing price over other factors, then the customer may be shown a set of properties in a particular order (e.g., based on ascending listing price).

Figure 3:
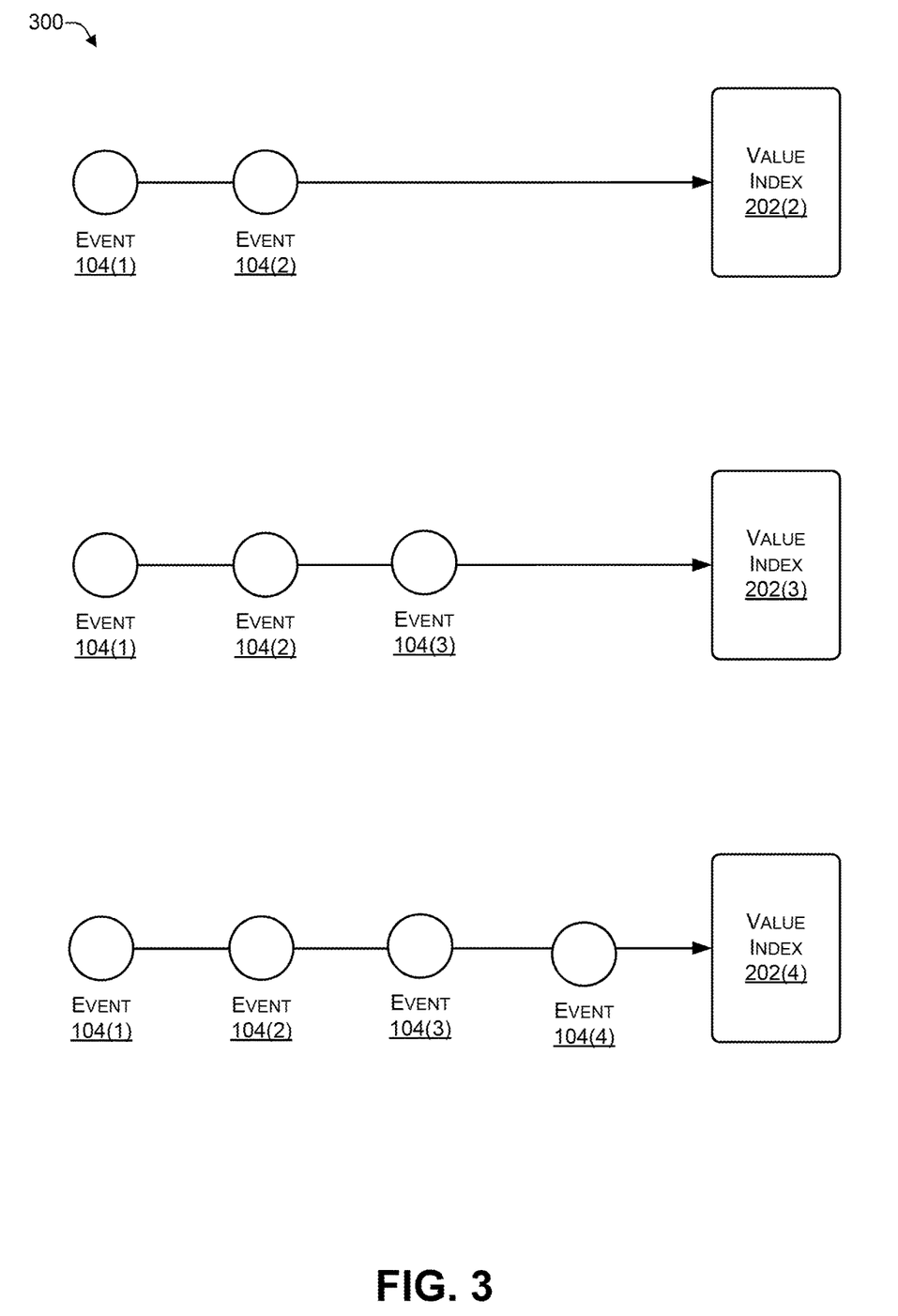
FIG. 3 is a block diagram illustrating evaluating sub-sequences according to some embodiments.

FIG. 3 is a block diagram 300 illustrating evaluating sub-sequences according to some embodiments. Sub-sequences may be used to iterate and determine each event's weight, and each event's value index. Each iteration includes estimating weights and calculating intermediate index values, until convergence within an acceptable tolerance is achieved. For example, the sub-sequence 104(1), 104(2), 104(3), and 104(4) may be iterated over to determine the VI 202(2), 202(3), and 202(4). To illustrate, the sub-sequence 104(1), 104(2) may be iterated over to determine the VI 202(2), the sub-sequence 104(1), 104(2), 104(3) may be iterated over to determine the VI 202(3), and the sub-sequence 104(1), 104(2), 104(3), and 104(4) may be iterated over to determine the VI 202(4).

FIG. 4 is a block diagram illustrating an architecture 400 to analyze event timelines according to some embodiments. In the architecture 400, multiple data sets 402 may be analyzed by an analysis module 404 to produce one or more results 406.

For example, the data sets 402 may include purchase data 408(1), finance data (e.g., associated with consumer financing) 408(2), demographic data (e.g., customer's age, income, zip code, and the like) 408(3), CSR contact data (e.g., why, when, and how the customer has contacted a CSR) 408(4), website access data (e.g., what type of information the customer obtains from the website) 408(5), warranty data 408(6) (e.g., warranty claim is indicative of certain customer activities), parts and service data 408(7), and marketing data 408(N) (e.g., how the customer has been provided marketing), where N>0. Of course, the data sets 402 may include other types of customer-related data.

The analysis module 404 may include an artificial intelligence (AI) engine 410 to perform an analysis of the data sets 402 and to determine the value indexes 404 based on the analysis. AI engine 410 may use machine learning, such as a classifier, to analyze the data sets 402 to determine value indexes 412. Data manifests 414 may identify where each of the data sets 402 are stored and how they are accessed. Business processes 416 may identify various business processes, such as customer relationship management (CRM), of a supplier. In some cases, the supplier may modify a particular one of the business processes if a majority of customers have a low value for the particular business process. Problem set 418 may define the problem(s) to be solved by the analysis module 404 and may be used with a context engine to correlate the problem set to past solutions. An AI manager 422 may manage the various processes to derive the value indexes 412. The decision data 424 may include a list of customer prospects, offers to be made, and preferred method of communication, and may be delivered to a salesperson, for example, through a customer relationship manager (CRM) system or email.

The value indexes 412 may include a supplier VI 428(1) associated with each supplier, a finance VI 428(2) including value indexes related to up-selling and cross-selling, an asset VI 428(3) including value indexes of assets (e.g., property, products, services, and the like) offered by the supplier, brand VI 428(4) identifying the value that each customer places on each supplier's brand, and other VIs 428(P) (where P>0) associated with each supplier.

The results 406 may include customer 430 related information, scoring 432, and valuations 434. The customer data 430 may include information, such as how to acquire particular types (e.g., income greater than X) of customers based on their values, how to retain customers based on their values, how to sell (e.g., new sales, up-sell, and cross-sell) to customers based on their values, etc. The scoring 432 may be information related to customer credit cores, such as the FICO® score, the customer's credit capacity, etc. For example, the scoring 432 may be used to present property listings that have listing prices within the customer's credit capacity. The valuations 434 may include how to present real-estate listings to a customer to reduce the time taken by the customer to make an offer, which vehicles to show a customer based on their values, etc. The valuations 434 may include (i) how to calculate an asking price and an expected days on market to a seller of a real estate property, (ii) an appraisal value of the property (e.g., for mortgage approval or a valuation of a bank's mortgage portfolio), (iii) how to present real-estate listings to a customer to reduce the time taken by the customer to make an offer, (iv) which vehicles to show a customer based on the customer's values, etc.

Figure 5:
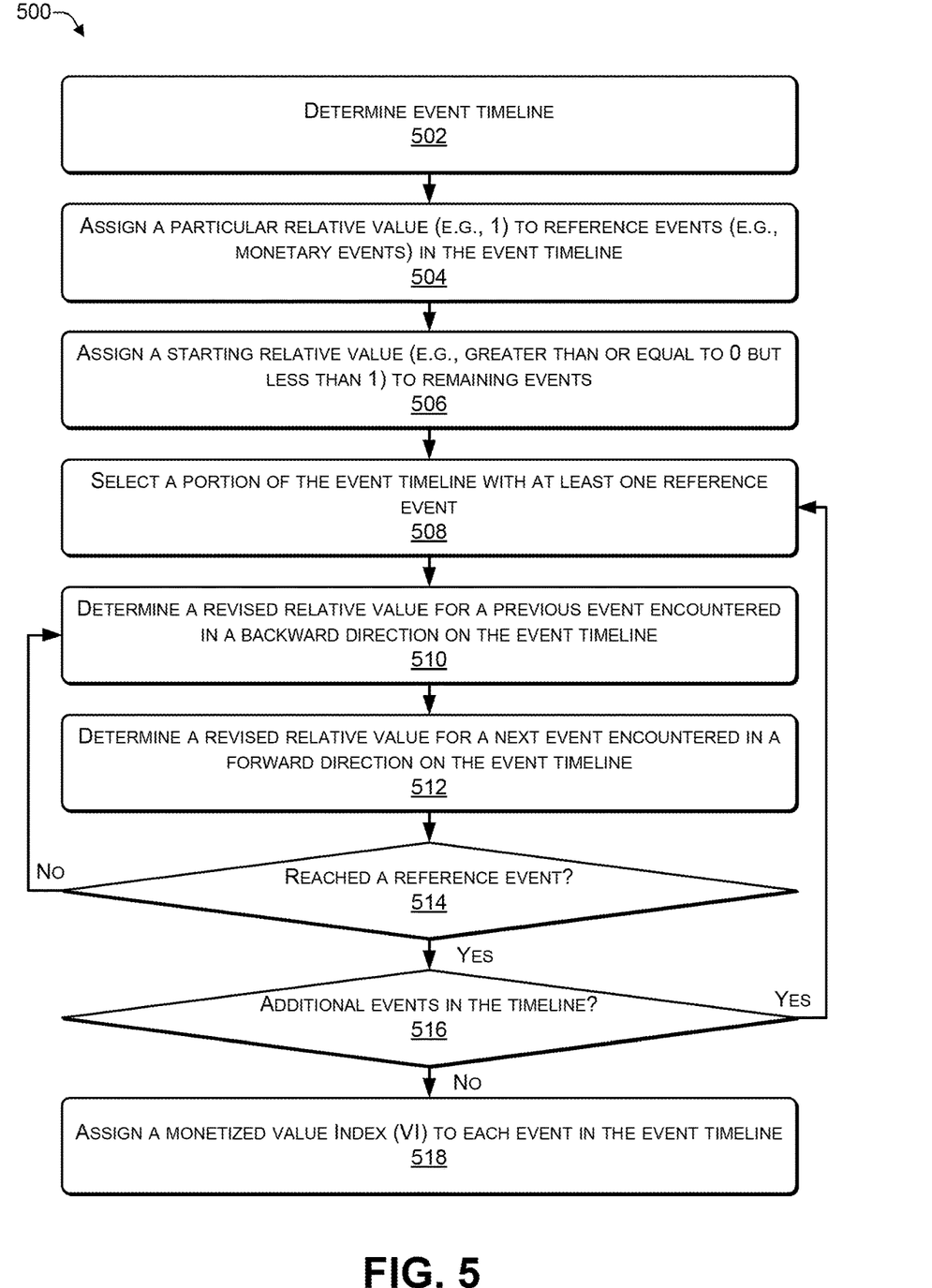
FIG. 5 is a flowchart of a process that includes determining a relative value for events in an event timeline according to some embodiments.
Figure 6:
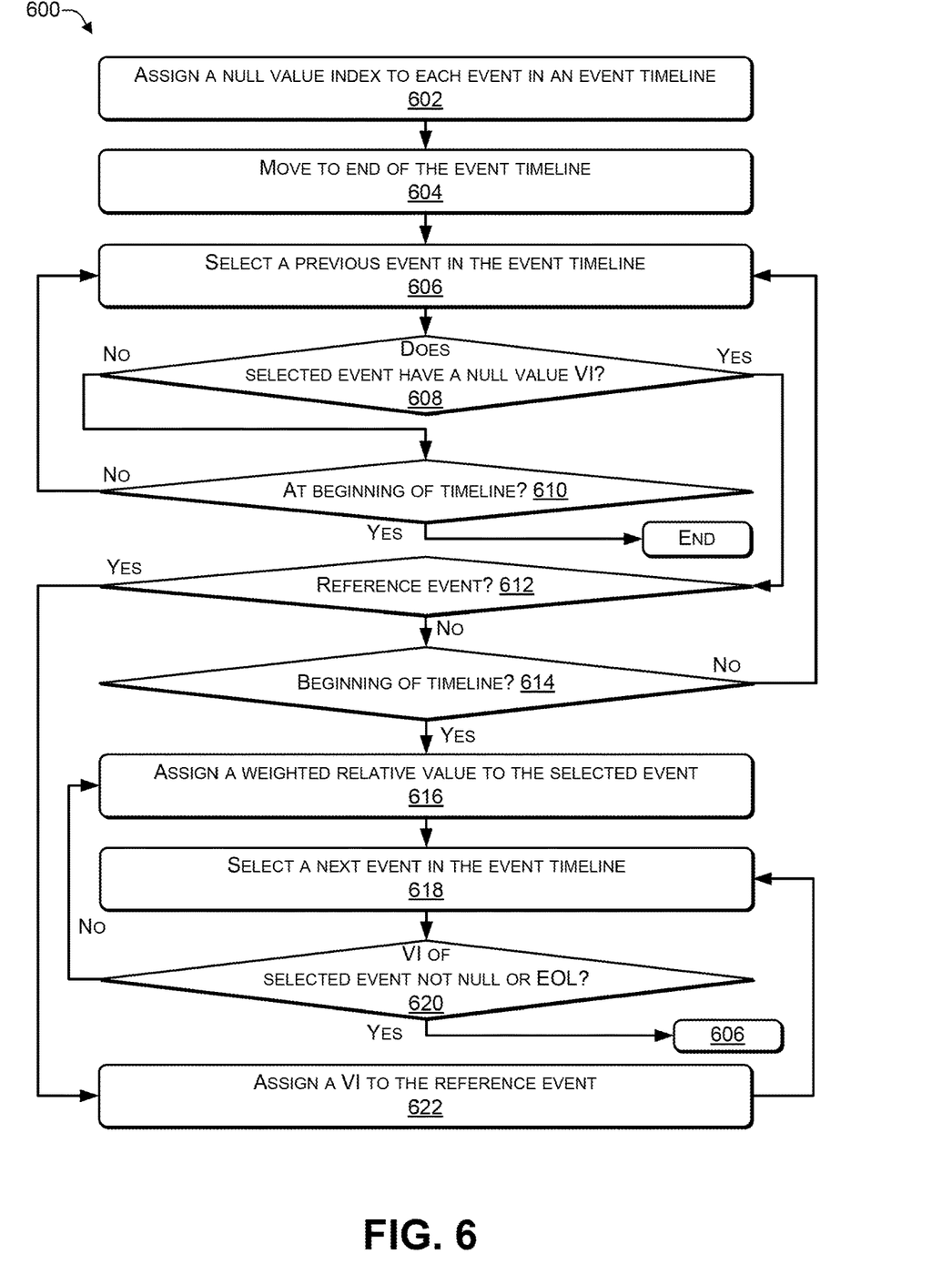
FIG. 6 is a flowchart of a process that includes assigning a monetized value index according to some embodiments.

In the flow diagrams of FIGS. 5 and 6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 500 and 600 are described with reference to FIGS. 1, 2, 3, and 4 as described above, although other models, frameworks, systems and environments may be used to implement these processes.

FIG. 5 is a flowchart of a process 500 that includes determining a relative value for events in an event timeline according to some embodiments. For example, the process 500 may be performed by the analysis module 404 of FIG. 4.

At 502, an event timeline may be determined. For example, in FIG. 1, the event timeline 102 may be determined by retrieving (or correlating) interaction data associated with a customer and a vendor.

At 504, a particular value may be assigned to each reference event in the event timeline. At 506, a starting value may be assigned to remaining events in the event timeline. For example, if a fractional value scale between 0 and 1 is used, each reference event may be assigned the value of 1. Of course, if a different scale is used (e.g., 0 to 10, 0 to 100, or the like) then a different value may be assigned to the reference event. Assigning the value of 1 when using a scale of between 0 and 1 may indicate that the reference event has the highest significance among the events. A random value (e.g., the random value may be greater than or equal to 0.00 and less than 1.00) may be assigned to the remaining (e.g., non-reference) events in the event timeline. Since the process 500 will iteratively revise the value of each non-reference event, the random value is merely a starting (e.g., seed) value that is subject to revision based on other events in the event timeline. In FIG. 1, the reference event 104(4) may be assigned a value of 1. In broad terms, a scale may be used for each value and the scale may range between a lower bound (e.g., 0.0) and an upper bound (e.g., 1.0). Reference events may be assigned the upper bound while non-reference events may be assigned a value that is less than the upper bound. The process 500 iteratively revises the value of each event, including reference events, in the event timeline. During the iterative process, the values of the reference events may drop from 1.0. However, as the iterative process continues, the values of the reference events eventually approaches 1.0. For example, after multiple iterations, the value of a reference event may be 0.99, 0.98 or the like.

At 508, a sub-sequence, e.g., a portion of the event timeline with at least one reference event, may be selected. For example, in FIG. 1, the sub-sequence including the events 104(1), 104(2), 104(3), and 104(4) may be selected.

At 510, a previous event in a backward direction (from the reference event) of the event timeline may be selected and the corresponding value revised. For example, in FIG. 1, for the sub-sequence including the events 104(4), 104(5), 104 (6), and 104(M), moving forward from the reference event 104(4), the event 104(5) may be selected.

At 512, a next event in a forward direction (from the reference event) of the event timeline may be selected and the corresponding value revised. For example, in FIG. 1, for the sub-sequence including the events 104(1), 104(2), 104 (3), and 104(4), moving backward from the reference event 104(4), the event 104(3) may be selected.

At 514, a determination may be made as to whether a reference event has been encountered. If at 514, a determination is made that "no" a reference event has not been encountered, then the process proceeds to 510. If at 514, a determination is made that "yes" a reference event has been encountered, then the process proceeds to 516. For example, in FIG. 1, events in the sub-sequence 104(1), 104(2), 104(3), and 104(4) may be repeatedly selected and a determination made as to whether the selected event is a reference event.

At 516, a determination is made whether the event timeline includes additional events. If at 516, a determination is made that "yes" there are additional events in the event timeline, then the process proceeds to 508. If at 516, a determination is made that "no" there are no additional events in the event timeline, then the process proceeds to 518. For example, in FIG. 1, if all of the events in the sub-sequence of 104(1), 104(2), 104(3), and 104(4) have been selected, then a new sub-sequence may be selected. If all of the events in the sub-sequence of 104(1), 104(2), 104(3), and 104(4) have not yet been selected, then a next event may be selected.

At 518, a monetized value index is assigned to each event in the event timeline. Assigning a monetized VI to each event in the event timeline is described in the more detail in the process 600 of FIG. 6.

FIG. 6 is a flowchart of a process 600 that includes assigning a monetized value index according to some embodiments. For example, the process 600 may be performed by the analysis module 404 of FIG. 4.

At 602, a null value may be assigned to the VI associated with each event in an event timeline. At 604, the process may move to an end of the event timeline. At 606, a previous event in the event timeline may be selected. Initially, the event that is selected may be a last event in the event timeline. For example, in FIG. 1, the process may move to the end of the timeline 102 and select the event 104(M).

At 608, a determination may be made as to whether the VI of the selected event has a null value assigned (e.g., indicating whether the event has been processed and assigned a VI). In response to determining, at 608, that the VI of the selected event is not assigned the null value (e.g., the event has been processed), the process proceeds to 610. In response to determining, at 608, that "yes" the VI of the selected event is assigned the null value (e.g., the event has not been processed), the process proceeds to 612.

At 610, a determination may be made as to whether the selected event is at the beginning of the timeline (e.g., whether the process has completed traversing the entire event timeline from the last event to the first event). In response to determining, at 610, that "yes" the selected event is at the beginning of the timeline, the process ends (e.g., because all events in the event timeline have been processed and assigned a VI). In response to determining, at 610, that the selected event is not at the beginning of the timeline, the process proceeds to 606.

At 612, a determination may be made as to whether the selected event is a reference event (e.g., a purchase greater than a threshold amount). In response to determining, at 612, that "yes" the selected event is a reference event, the process proceeds to 610 (e.g., no weighting is used because the purchase amount is the value index). In response to determining, at 612, that the selected event is not a reference event, the process proceeds to 614. For example, in FIG. 1, when the reference event 104(4) is selected, the VI 106 of the reference event 104(4) is assigned the amount of the purchase. A reference event may include a purchase greater than a threshold amount to distinguish relatively large purchases (e.g., event 104(4)) from relatively small purchases (e.g., event 104(M)). For example, the event 104(4) may include the purchase of a $30,000 vehicle (e.g., a relatively large purchase), while the event 104(M) may include the purchase of windshield wiper blades (e.g., a relatively small purchase). In this example, the threshold amount to distinguish reference events from other events may be a large amount, such as $1000 or $10,000.

At 614, a determination may be made as to whether the selected event is at the beginning of the timeline (e.g., whether all events in the timeline been processed and assigned a VI). In response to determining, at 614, that "yes" the selected event is at the beginning of the timeline, the process proceeds to 615. In response to determining, at 614, that the selected event is not at the beginning of the timeline, the process proceeds to 606.

At 616, a weighted relative value may be assigned to the VI of the selected event. For example, in FIG. 2, the value 202(1) may be determined by multiplying the monetary value of the reference event 104(4) by the corresponding weight 204(1). To illustrate, for a first customer, on a scale between 0.00 and 1.00, the weight 204(1) may be 0.3 (e.g., 30%), the weight 204(2) may be 0.2 (e.g., 20%), and the weight 204(3) may be 0.5 (e.g., 50%). If the monetary value of the reference event 104(4) is $30,000 and the weight 204(1) is 0.30, then the VI (monetized value index) 202(1) is $30,000×0.30=$9,000. Similarly, the VI 202(2) is assigned by multiplying the monetary value of the reference event 104(4) by the corresponding weight 204(2), e.g., $30,000×0.20=$6,000. The VI 202(3) is assigned by multiplying the monetary value of the reference event 104(4) by the corresponding weight 204(3), e.g., $30,000×0.50=$15,000.

At 618, a next event (e.g., by moving forward) in the event timeline may be selected. At 620, a determination may be made as to whether the VI for the selected event is not null or whether an endpoint of the timeline has been reached. In response to determining, at 620, that "yes" the VI for the selected event is not null or we have reached the endpoint of the timeline (e.g., all events in the event timeline have been processed), the process proceeds to 606. In response to determining, at 620, that the VI for the selected event is null, which also implies we have not yet reached the endpoint of the timeline, the process proceeds to 616.

At 622, a VI is assigned to the reference event. The VI for a reference event, such as a purchase, may be the monetary value of the transaction (or some other value that the transaction represents to the supplier).

For example, for a car purchase of $24,630, an analysis of the event timeline may provide the following value indexes. Note that the value indexes reflect a relative value that the customer places on each particular factor relative to other factors. For example, in the example below, the supplier may use the value indexes to determine that lease financing has a significantly higher value for a particular customer than a free oil change. The value indexes may not add up to the purchase price of the product.

| | |
|---|---|
| Service car due to recall | $6400 |
| Lease Financing | $5500 |
| Tires | $400 |
| Warranty Work | $4600 |
| Dealer | −$3000 |
| Salesperson | $1930 |
| Free Oil Change | $300 |
| Service people | −$1000 |
| Safety Features | $5500 |
| Credit card with cashback for car purchase | $2150 |
| Upgraded infotainment system | $1850 |

As another example, a Platinum credit card with no annual fee may have a value to the customer of $500 based on the following customer value indexes. As previously noted, the value indexes reflect a value that the customer places on each particular factor relative to other factors. Therefore, the sum of the value indexes may not add up to the annual fee of the credit card.

| | |
|---|---|
| Credit limit | $400 |
| Rewards program | −$1000 |
| Forex rates | $400 |
| Pay with points | $100 |
| Rental car insurance | $800 |
| Interest rate | −$750 |
| Pay by waving card | $50 |
| Concierge service | $50 |
| Fraud Service | $100 |
| Extended warranty on purchases | $350 |

Figure 7:
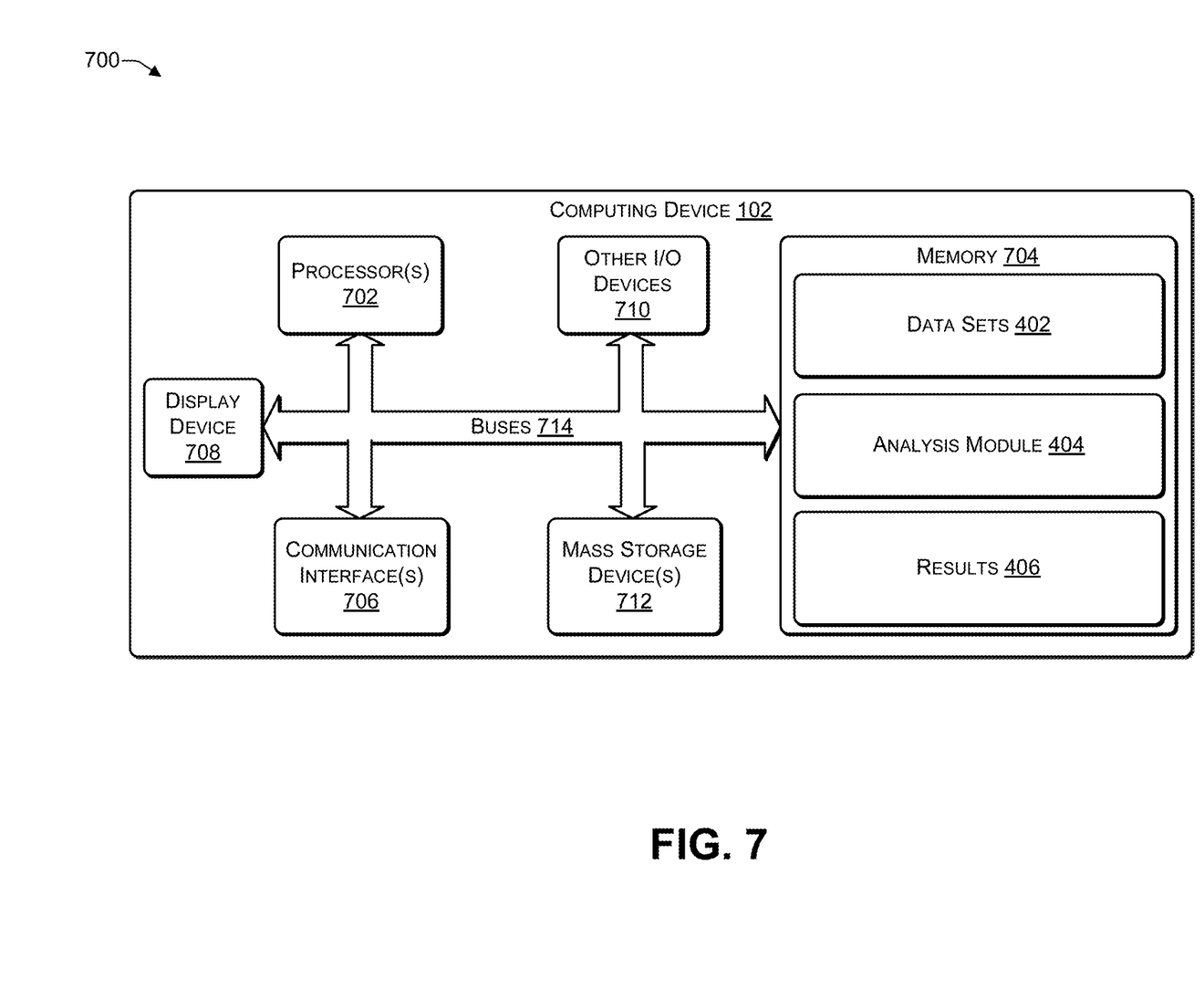
FIG. 7 illustrates an example configuration of a computing device that can be used to implement the systems and techniques described herein.

FIG. 7 illustrates an example configuration of the computing device (e.g., server) 700 that can be used to implement the systems and techniques described herein. The computing device 102 may include one or more processors 702, a memory 704, communication interfaces 706, a display device 708, other input/output (I/O) devices 710, and one or more mass storage devices 712, configured to communicate with each other, such as via system buses 714 or other suitable connection. The system buses 714 may include multiple buses, such as memory device buses, storage device buses, power buses, video signal buses, and the like. A single bus is illustrated in FIG. 7 purely for ease of understanding.

The processors 702 are one or more hardware devices that may include a single processing unit or a number of processing units, all of which may include single or multiple computing units or multiple cores. The processors 702 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processor 702 may be configured to fetch and execute computer-readable instructions stored in the memory 704, mass storage devices 712, or other computer-readable media.

Memory 704 and mass storage devices 712 are examples of computer storage media (e.g., memory storage devices) for storing instructions that can be executed by the processor 702 to perform the various functions described herein. For example, memory 704 may include both volatile memory and non-volatile memory (e.g., RAM, ROM, or the like) devices. Further, mass storage devices 712 may include hard disk drives, solid-state drives, removable media, including external and removable drives, memory cards, flash memory, floppy disks, optical disks (e.g., CD, DVD), a storage array, a network attached storage, a storage area network, or the like. Both memory 704 and mass storage devices 712 may be collectively referred to as memory or computer storage media herein, and may be a media capable of storing computer-readable, processor-executable program instructions as computer program code that can be executed by the processor 702 as a particular machine configured for carrying out the operations and functions described in the implementations herein.

The computing device 700 may also include one or more communication interfaces 706 for exchanging data via the network 118 with network elements 716. The communication interfaces 706 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 706 can also provide communication with external storage (not shown), such as in a storage array, network attached storage, storage area network, or the like. A display device 708, such as a monitor may be included in some implementations for displaying information and images to users. Other I/O devices 710 may be devices that receive various inputs from a user and provide various outputs to the user, and may include a keyboard, a remote controller, a mouse, a printer, audio input/output devices, and so forth.

The computer storage media, such as memory 704 and mass storage devices 712, may be used to store software and data. For example, the computer storage media may be used to store the data sets 402, the analysis module 404, and the results 406.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this imple-mentation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method, comprising:
   obtaining, with an artificial intelligence engine executing on one or more processors, one or more datasets out of a plurality of datasets having a plurality of interaction-event records, wherein:
      the interaction-event records describe respective interaction events,
      the interaction events are interactions in which a first entity has experiences or obtains other information pertaining to second entity, and
      at least some of the interaction-event records are associated with respective values by which sequences of at least some of the interaction events relative to one another are ascertainable;
   obtaining, with the artificial intelligence engine, a designation of one of the interaction events in the one or more datasets as a reference event;
   obtaining, with the artificial intelligence engine, a value ascribed to the reference event by the first entity;
   selecting, with the artificial intelligence engine, a portion of an event sequence including a subset of the interaction events among which is the reference event;
   determining, using a classifier of the artificial intelligence engine, relative values for at least some interaction events in the subset;
   assigning, with the artificial intelligence engine, a value index to individual interaction events among the subset;
   determining, with the artificial intelligence engine, based on at least some of the interaction-event records, sets of event-value scores, the sets corresponding to at least some of the interaction events, wherein:
      at least some respective event-value scores are indicative of a respective value ascribed by the first entity to a respective aspect of the second entity; and
      at least some respective event-value scores are based on both:
         respective contributions of respective corresponding events to a subsequent event in the one or more out of the plurality of datasets, and
         a value corresponding to the value index and ascribed to a subsequent event in the one or more out of the plurality of datasets, the subsequent event occurring after the respective corresponding events;
   obtaining a machine learning model by pitting a first machine learning algorithm against a second machine learning algorithm in a competition, the competition including:
      selecting the first machine learning algorithm and the second machine-learning algorithm from a set of candidate machine learning algorithms;

providing a problem to both the first machine learning algorithm and the second machine-learning algorithm;

solving the problem with both the first machine learning algorithm and the second machine-learning algorithm; and comparing solutions to the problem from both the first machine learning algorithm and the second machine-learning algorithm to determine whether to include the first machine learning algorithm or the second machine-learning algorithm in the machine learning model; and determining sets of event-value scores comprises:

determining initial values of at least one type of score in the sets of event-value scores; and iteratively adjusting the at least one type of score with the machine learning model; and storing, with the artificial intelligence engine, the sets of event-value scores in memory.

2. The method of claim 1, wherein:

for at least a plurality of the interaction events, a set of event-value scores is determined for the respective interaction event among the plurality of the interaction events.

3. The method of claim 1, wherein:

each of at least some of the sets of event-value scores include a plurality of different scores corresponding to different aspects of the second entity to which the first entity ascribes respective values.

4. The method of claim 3, wherein:

the different aspects include an overall brand of the second entity and a product of the second entity.

5. The method of claim 1, wherein:

the second entity is one or more businesses, organizations, or people; and the first entity is one or more businesses, organizations, or people.

6. The method of claim 1, wherein:

for at least some of the sets of event-value scores, each respective set includes both:

a respective weight corresponding to a contribution of the respective interaction event toward influencing the first entity to cause the subsequent event, and a respective value index based on a product of respective weight and a value ascribed to the subsequent event by the second entity.

7. The method of claim 1, wherein:

determining sets of event-value scores comprises determining sets of event-value scores corresponding to events occurring after the subsequent event.

8. The method of claim 1, wherein:

the events include both transaction and non-transaction events;

the events include both direct and indirect interactions;

the interaction-event records are obtained from diverse data sets; and at least some of the event-value scores are determined at least in part with a machine learning classifier.

9. The method of claim 1, comprising:

selecting the subsequent event by determining that the subsequent event has greater than a threshold value ascribed to the subsequent event by the first entity.

10. The method of claim 1, wherein:

a plurality of sets of event-value scores are determined for a given event, each set of the plurality corresponding to a different subsequent event.

11. The method of claim 1, wherein:

the initial values are random values within a bounded range between a first bound and a second bound; and the at least one type of score is initialized at the first bound or the second bound for the subsequent event.

12. The method of claim 1, wherein:

the at least one type of score is determined in order for at least some of the events in an iteration sequentially backward in time from the subsequent event.

13. The method of claim 1, wherein:

three or more events contribute to the subsequent event;

each of the three or more events has a respective set of event-value scores;

the respective sets of event-value scores each include a respective value index; and the value indices of events contributing to the subsequent event sum to greater than a value ascribed to the subsequent event by the first entity.

14. The method of claim 1, wherein:

the one or more datasets comprise a timeline of the event records;

at least some of the events are monetary transactions;

at least some of the events are non-monetary transactions;

the first entity is a customer of the second entity;

the second entity is a business;

the event-value scores are indicative of the customer's view of intrinsic and monetary value that the customer ascribes to the customer's relationship to the business at a respective time corresponding to the respective event;

the method comprises at least partially configuring a next interaction with the consumer pertaining the business based on at least a plurality of the event-value scores;

at least some events include at least one of the following:

the customer receiving a catalog, brochure, or other mailer via mail or email, the customer visiting a website of the business to research one or more items, the customer chatting online or in-person with a customer service representative or other sales representative of the business, or the customer purchasing an item, the customer submitting an online review, the customer purchasing another item that is an accessory to the item, or the customer responding to a survey; and the method comprises:

obtaining designations of a first subset of the events as reference events, the first subset including the subsequent event; and for each of at least some of the reference events, determining, based on at least some of the event records, contribution scores of at least a plurality of earlier events that are earlier than the respective reference event, wherein the contribution scores are indicative of a respective contribution of the respective earlier event to occurrence of the respective reference event.

15. The method of claim 1, comprising:

steps for analyzing an event timeline that includes events and assigning a value index to each event.

16. The method of claim 1, comprising:

selecting a type of interaction for the first entity to experience in the future based on the sets of event-value scores stored in memory.

17. The method of claim 1, wherein:

the events include both real interactions and synthesized interactions.

* * * * *